US008473913B2

(12) United States Patent
Noller et al.

(10) Patent No.: US 8,473,913 B2
(45) Date of Patent: Jun. 25, 2013

(54) METHOD OF AND SYSTEM FOR DYNAMIC AUTOMATED TEST CASE GENERATION AND EXECUTION

(75) Inventors: Jesse A. Noller, Hudson, MA (US); Robert S. Mason, Jr., Uxbridge, MA (US)

(73) Assignee: Hitachi Data Systems Corporation, Santa Clara, CA (US)

( * ) Notice: Subject to any disclaimer, the term of this patent is extended or adjusted under 35 U.S.C. 154(b) by 1964 days.

(21) Appl. No.: 11/329,631

(22) Filed: Jan. 11, 2006

(65) Prior Publication Data

US 2007/0162894 A1 Jul. 12, 2007

(51) Int. Cl.
*G06F 9/44* (2006.01)

(52) U.S. Cl.
USPC ............ 717/124; 717/125; 717/126; 717/128

(58) Field of Classification Search
None
See application file for complete search history.

(56) References Cited

U.S. PATENT DOCUMENTS

| | | | |
|---|---|---|---|
| 5,542,043 A | | 7/1996 | Cohen et al. |
| 5,671,351 A * | | 9/1997 | Wild et al. ...................... 714/38 |
| 6,002,869 A * | | 12/1999 | Hinckley ...................... 717/124 |
| 6,668,340 B1 * | | 12/2003 | Baker et al. .................. 714/38.1 |
| 7,055,067 B2 * | | 5/2006 | DiJoseph ........................ 714/38 |
| 7,165,241 B2 * | | 1/2007 | Manda et al. ................. 717/124 |
| 7,334,220 B2 * | | 2/2008 | Chang et al. .................. 717/126 |
| 7,343,587 B2 * | | 3/2008 | Moulden et al. .............. 717/124 |
| 7,861,226 B1 * | | 12/2010 | Episkopos et al. ............ 717/124 |
| 7,917,895 B2 * | | 3/2011 | Givoni et al. ................. 717/124 |
| 8,074,204 B2 * | | 12/2011 | Comstock et al. ............ 717/125 |
| 2002/0065641 A1 * | | 5/2002 | Ramsey ........................... 703/17 |
| 2002/0066077 A1 * | | 5/2002 | Leung ............................ 717/126 |
| 2003/0159089 A1 * | | 8/2003 | DiJoseph ........................ 714/38 |
| 2004/0078742 A1 * | | 4/2004 | Emek et al. .................... 714/728 |
| 2004/0255275 A1 * | | 12/2004 | Czerwonka .................... 717/124 |
| 2005/0043919 A1 * | | 2/2005 | Kennedy et al. .............. 702/182 |
| 2005/0256665 A1 * | | 11/2005 | Hartmann et al. ............. 702/121 |
| 2006/0036910 A1 * | | 2/2006 | Fung et al. ...................... 714/25 |
| 2006/0059253 A1 * | | 3/2006 | Goodman et al. ............. 709/223 |
| 2008/0082968 A1 * | | 4/2008 | Chang et al. .................. 717/128 |

OTHER PUBLICATIONS

Sant et al., An exploration of statistical models for automated test case generation, Jul. 2005, 7 pages, <http://delivery.acm.org/10.1145/1090000/1083256/p10-sant.pdf>.*
Offutt et al., Generating test cases for web services using data perturbation, Sep. 2004, 10 pages, <http://delivery.acm.org/10.1145/1030000/1022529/p4-offutt.pdf>.*
Liu et al., Automated verification and test case generation for input validation, May 2006, 7 pages, <http://delivery.acm.org/10.1145/1140000/1138936/p29-liu.pdf>.*

* cited by examiner

*Primary Examiner* — Thuy Dao
(74) *Attorney, Agent, or Firm* — David H. Judson

(57) ABSTRACT

An automated system randomly generates test cases for hardware or software quality assurance testing. A test case comprises a sequence of discrete, atomic steps (or "building blocks"). A particular test case has a variable number of building blocks. The system takes a set of test actions and links them together to create a much larger library of test cases or "chains." The chains comprise a large number of random sequence tests that facilitate "chaos-like" or exploratory testing of the overall system under test. Upon execution in the system under test, the test case is considered successful if each building block in the chain executes successfully; if any building block fails, the test case, in its entirety, is considered a failure.

19 Claims, 3 Drawing Sheets

METHOD OF AND SYSTEM FOR DYNAMIC AUTOMATED TEST CASE GENERATION AND EXECUTION

BACKGROUND OF THE INVENTION

1. Technical Field

The present invention relates generally to quality assurance testing of computer systems and software.

2. Description of the Related Art

There are many well-known approaches to testing software during the development of a complex system. During the feature/test development phase, for example, a quality assurance engineer may devise a series of static test cases against which a system under development may be exercised. A test case is typically defined as a single step, and its expected result, along with one or more other pieces of information such as a case identifier, test author, or the like. Occasionally, a test case may be a series of steps with one expected result or outcome. The one or more steps associated with a given test case often are stored in a test plan document, a spreadsheet, a database, or other common repository (which may also store past test results and similar information). A set or collection of test cases is sometimes referred to a test suite.

The process of generating test cases is usually a manual one, although automated techniques have been described, e.g., U.S. Pat. No. 5,542,043. Regardless of the type of system involved, the test cases typically are derived from a well-defined series of simple discrete, atomic base actions (e.g., writing a set of files is a first action, reading the set of files is a second action, and so on). In this manner, and given a library of base actions, it is possible to design and implement a set of well-defined test cases. These test cases would then be useful to perform a given degree of test coverage for the system feature areas, but such testing is necessarily circumscribed by the nature and scope of the base library and the limited manner in which the actions may be associated with one another.

There are inherent issues with the prior art with respect to the veracity of a given test cases (e.g., the subjective value of the test case vis-à-vis the features actually tested), as well as the number of test cases that can be implemented efficiently. The latter problem typically is caused by time and labor restraints, especially where manual testing is used. While automated test case generation approaches (such as described in the above-identified patent) can be useful, they have not adequately addressed these problems.

It would be highly desirable to provide an improved technique for automating the generation and managed execution of a much broader range of test cases than has been possible using the prior art. The present invention addresses this problem.

BRIEF SUMMARY OF THE INVENTION

An object of the present invention is to provide an automated system that intelligently and randomly generates test cases for use in hardware or software quality assurance testing, wherein a given test case comprises a sequence (or "chain") of discrete, atomic steps (or "building blocks"). A test case is a chain of building blocks, preferably with each building block linked to a next building block. Accordingly, a given building block therefore is sometimes referred to as a "link." Preferably, each building block is executable in a single-threaded or multi-threaded execution environment. Thus, in a multi-threaded environment, one or more building blocks are executed concurrently in different threads, and individual building blocks may themselves be single or multi-threaded. The test case is considered successful (i.e., a pass) if each building block in the chain executes successfully; if any building block fails, the test case, in its entirety, is considered a failure, but not necessarily discarded. A particular test case is a sequence of potentially infinite size; thus, a given sequence has a variable number of building blocks. A given link may also pass information to another link, and one link may, in turn, reference another during the course of execution.

In one embodiment, the system randomly generates test cases (chains) based on a series of underlying building blocks (or other pre-existing test cases) that are then linked (chained) together into one or more applicable test cases, and then executes those tests. More generally, the system takes a set of test actions (or even test cases) and links them together in a relevant and useful manner to create a much larger library of test cases or "chains." The chains comprise a large number of random sequence tests that facilitate "chaos-like" or exploratory testing of the overall system under test. The chains themselves potentially can then be chained to one another to create a new tier of tests. Preferably, each chain is a test case that is self-documenting, discrete and re-creatable as needed.

The system adapts and dynamically generates new test cases as underlying data changes (e.g., a building block is added, deleted, modified) or as new test cases themselves are generated.

According to another feature of the invention, the system is tunable to generate test sequences that have a given (e.g., higher) likelihood of finding bugs or generating errors from which the testing entity can then assess the system operation. To this end, preferably a tunable risk factor or level is associated with a given link in a chain. In an illustrative embodiment, a given link may have one of several values such as basic, intermediate or advanced. A basic link has a first value, an intermediate link has a second value, and an advanced link has a third value. Preferably, the number of levels and their associated values are tunable. Using these individual link risk factors, the system can generate a risk assessment (e.g., expressed as a percentage value or other metric) for the chain as a whole, or for some given portion of the chain. An aggregate or composite risk assessment for the chain (or chain portion) preferably is then determined by counting the number of occurrences of each link and its associated value. By generating high (or higher) risk sequences, the testing entity increases the likelihood of finding or isolating bugs or errors in the system under test. The testing entity can identify such sequences by configuring the system, e.g., "generate chains with an aggregate percentage greater than x %" or the like. Where multi-threaded execution is used, the system may tune the number of threads as a function of the designated risk assessment for the chain or chain portion.

In the case of multi-threaded execution, preferably an initial risk assessment is recalculated based on a number of threads and the likelihood of two actions from a same "pool" occurring at the same point in time instead, for example, linearly in the sequence. In this embodiment, preferably each executor thread within the system maintains a journal of what action was executed at what time. Merging the journals, e.g., after each run, allows replayability of the chain in a multi-threaded execution environment, thereby recreating a previous run.

Thus, according to another important advantage of the invention, the system includes an ability to replay generated chains, thereby enabling given test sequences (no matter how complex) to be easily reproducible. As noted above, in one embodiment, the ability to replay generated chains is facilitated by having each of a set of execution threads maintain discrete journals that can then be merged into an aggregate journal for a given test case.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN EMBODIMENT

Figure 1:
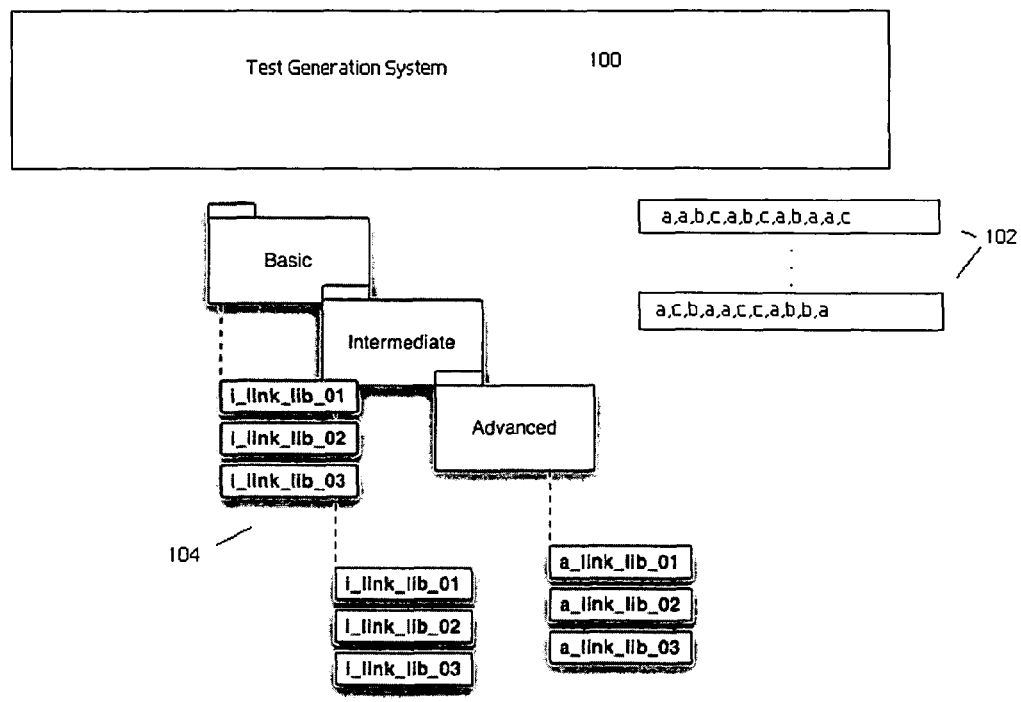
FIG. 1 is a simplified block diagram of how the test generation system of the present invention generates tests from a library of test actions.

As shown in FIG. 1, the present invention is a test generation system 100 that is used to generate a set of tests 102 from a library of test actions 104. The tests 102 are then executed (e.g., by some other system) against a system or product under test (SUT) for quality assurance (Q/A) purposes. A particular test 102 may be replayed at any time. The particular system under test may be of any type, as the present invention is concerned primarily with the methodology for generating the tests themselves. The invention may be used to generate test cases for any system under test (SUT) regardless of the machine, operating environment, application or networking environment.

Figure 2:
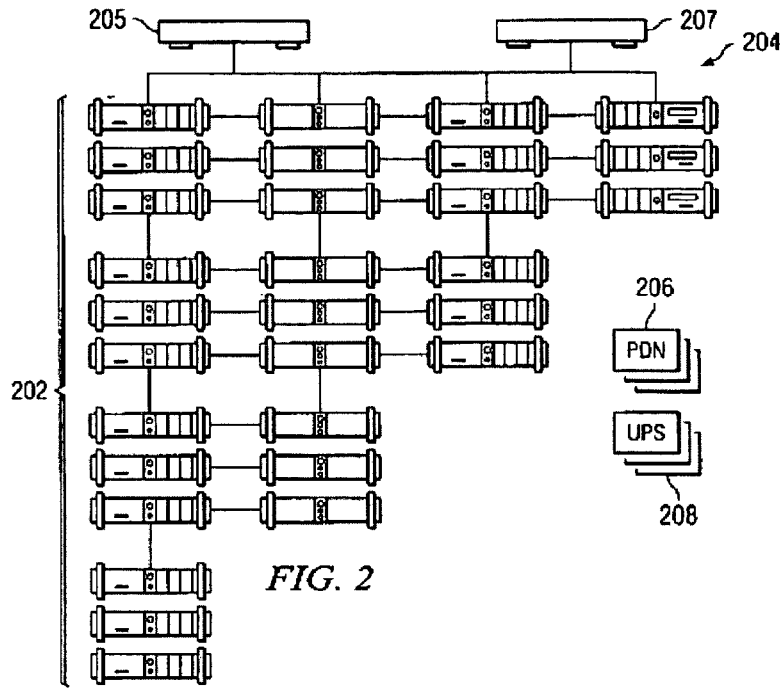
FIG. 2 is a simplified representation of a redundant array of independent nodes each of which supports an archive cluster application for which the test cases are generated according to the present invention.

In this representative embodiment, the invention is used to generate the test cases for an "archive cluster application" that provides an archival storage management system. By way of brief background, it is assumed that the storage management system is defined by a set of nodes that potentially comprise different hardware and thus may be considered "heterogeneous." A node typically has access to one or more storage disks, which may be actual physical storage disks, or virtual storage disks, as in a storage area network (SAN). The archive cluster application that is supported on each node may be the same or substantially the same. Using the system, enterprises can create permanent storage for many different types of fixed content information such as documents, e-mail, video, and the like, among others. As described in U.S. Publication No. 2005/0120025, the archive cluster application is a distributed software application executed on each node that captures, preserves, manages, and retrieves digital assets. As illustrated in FIG. 2, a physical boundary of an individual archive is referred to as a cluster. Typically, a cluster is not a single device, but rather a collection of devices. Devices may be homogeneous or heterogeneous. A typical device is a computer or machine running an operating system such as Linux. Clusters of Linux-based systems hosted on commodity hardware provide an archive that can be scaled from a few storage node servers to many nodes that store thousands of terabytes of data. Preferably, data is replicated across the cluster so that the archive is protected from device failure. If a disk or node fails, the cluster automatically fails over to other nodes in the cluster that maintain replicas of the same data.

The illustrative cluster comprises nodes 202, a pair of network switches 204, power distribution units (PDUs) 206, and uninterruptible power supplies (UPSs) 208. A node 202 typically comprises one or more commodity servers and contains a CPU (e.g., Intel x86, suitable random access memory (RAM), one or more hard drives (e.g., standard IDE/SATA, SCSI, or the like), and network interface (NIC) cards. The network switches 204 typically comprise an internal switch 205 that enables peer-to-peer communication between nodes, and an external switch 207 that allows extra-cluster access to each node. PDUs 206 are used to power all nodes and switches, and the UPSs 208 are used that protect all nodes and switches. Typically, a cluster is connectable to a network, such as the public Internet, an enterprise intranet, or other wide area or local area network. End users access the cluster using any conventional interface or access tool. Thus, for example, access to the cluster may be carried out over any IP-based protocol (HTTP, FTP, NFS, AFS, SMB, a Web service, or the like), via an API, or through any other known or later-developed access method, service, program or tool. Client applications access the cluster through one or more types of external gateways such as standard UNIX file protocols, or HTTP APIs. The archive preferably is exposed through a virtual file system that sits under any standard UNIX file protocol-oriented facility.

Figure 3:
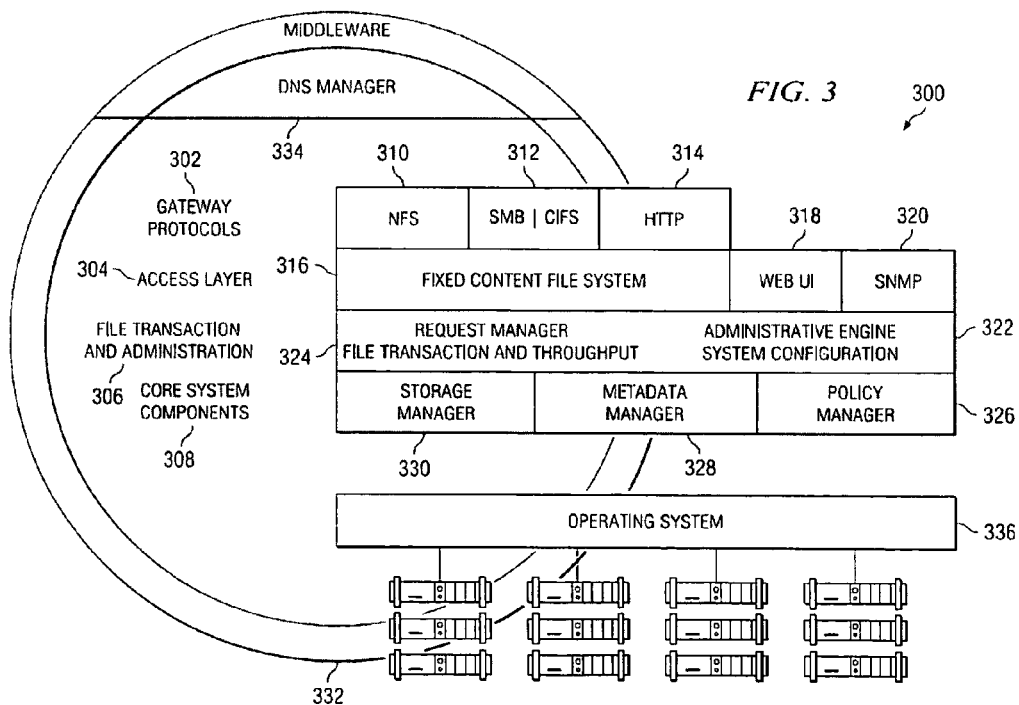
FIG. 3 is a high level representation of the various components of the archive cluster application executing on a given node in the system of FIG. 2.

In this example testing environment, the archive cluster application runs on a redundant array of independent nodes (H-RAIN) that are networked together (e.g., via Ethernet) as a cluster. Each node runs an instance 300 of a distributed application comprised of several runtime components as illustrated in FIG. 3. As will be described, the present invention generates test cases for this system under test. The software components comprise a gateway protocol layer 302, an access layer 304, a file transaction and administration layer 306, and a core components layer 308. The gateways provide native file services such as NFS 310 and SMB/CIFS 312, as well as a Web services API to build custom applications. HTTP support 314 is also provided. The access layer 304 provides access to the archive. A fixed content file system (FCFS) 316 emulates a native file system to provide full access to archive objects. The access layer 304 preferably also includes a Web user interface (UI) 318 and an SNMP gateway 320. The Web user interface 318 provides interactive access to an administration engine 322 in a file transaction and administration layer 306. The SNMP gateway 320 provides storage management applications access to the administration engine 322, enabling them to securely monitor and control cluster activity. The administration engine monitors cluster activity, including system and policy events.

The file transaction and administration layer 306 also includes a request manager process 324. The request manager 324 manages requests from the external world (through the access layer 304), as well as internal requests from a policy manager 326 in the core components layer 308. In addition to the policy manager 326, the components may include a metadata manager 328, and one or more instances of a storage manager 330. The storage manager 330 on a given node is responsible for managing the physical storage devices. The request manager 324 is responsible for executing the set of operations needed to perform archive actions by interacting with other components within the system. A metadata manager 328 preferably is installed on each node. Collectively, the metadata managers in a cluster act as a distributed database, managing archive objects. The storage manager 330 provides a file system layer available to all other components in the distributed application. Preferably, it stores the data objects in a node's local file system. The storage manager 330 also provides system information, integrity checks on the data, and the ability to traverse local directly structures. As also illustrated in FIG. 3, the cluster manages internal and external communication through a communications middleware layer 332 and a DNS manager 334. The application instance executes on a base operating system 336.

A cluster's primary responsibility is to store an unlimited number of files on disk reliably.

The present invention is a method of and system for automated test case generation of a system under test (SUT) such as the archive cluster described above. In a representative embodiment, a test case generation system is used to self-generate test cases from a series of basic actions. The actions are the basic building blocks of the test cases, and each building block or link is preferably a discrete, atomic operation. In the context of the archival system, such building blocks may be as simple as "write N files into the archive," "drop a given node of the archive," "execute a given policy against the archive," "write 10,000 files with 100 threads via multiple input gateways," "disable a random storage point within the system," or the like. Of course, the above are merely illustrative.

Figure 4:
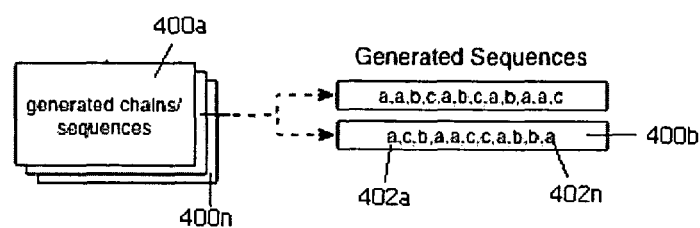
FIG. 4 illustrates in more detail how test sequences are generated from a library of test actions according to the present invention.

As illustrated in FIG. 4, the automated system generates test cases 400*a*-*n* for use in quality assurance testing, wherein a given test case 400*b* comprises a sequence (or "chain") of discrete, atomic steps (or "building blocks") 402*a*-*n*. A particular test case (i.e., a given sequence) has a variable number of building blocks. The system takes a set of test actions (or even test cases) and links them together in a relevant and useful manner to create a much larger library of test cases or "chains." The chains comprise a large number of intelligently random sequenced test building blocks that facilitate random ("chaos-like") or exploratory testing of the overall system under test 404. Upon execution in/against the system under test, the test case is considered successful (i.e., a pass) if each building block (or link) in the chain executes successfully; if any building block (or link) fails, the test case, in its entirety, is considered a failure. Preferably, and as will be seen, the system adapts and dynamically generates new test cases as underlying data changes (e.g., a building block is added, deleted, modified) or new test cases themselves are generated. Also, the system is tunable to generate test sequences that have a given (e.g., higher) likelihood of finding bugs or generating errors from which the user can then assess the system operation.

Figure 5:
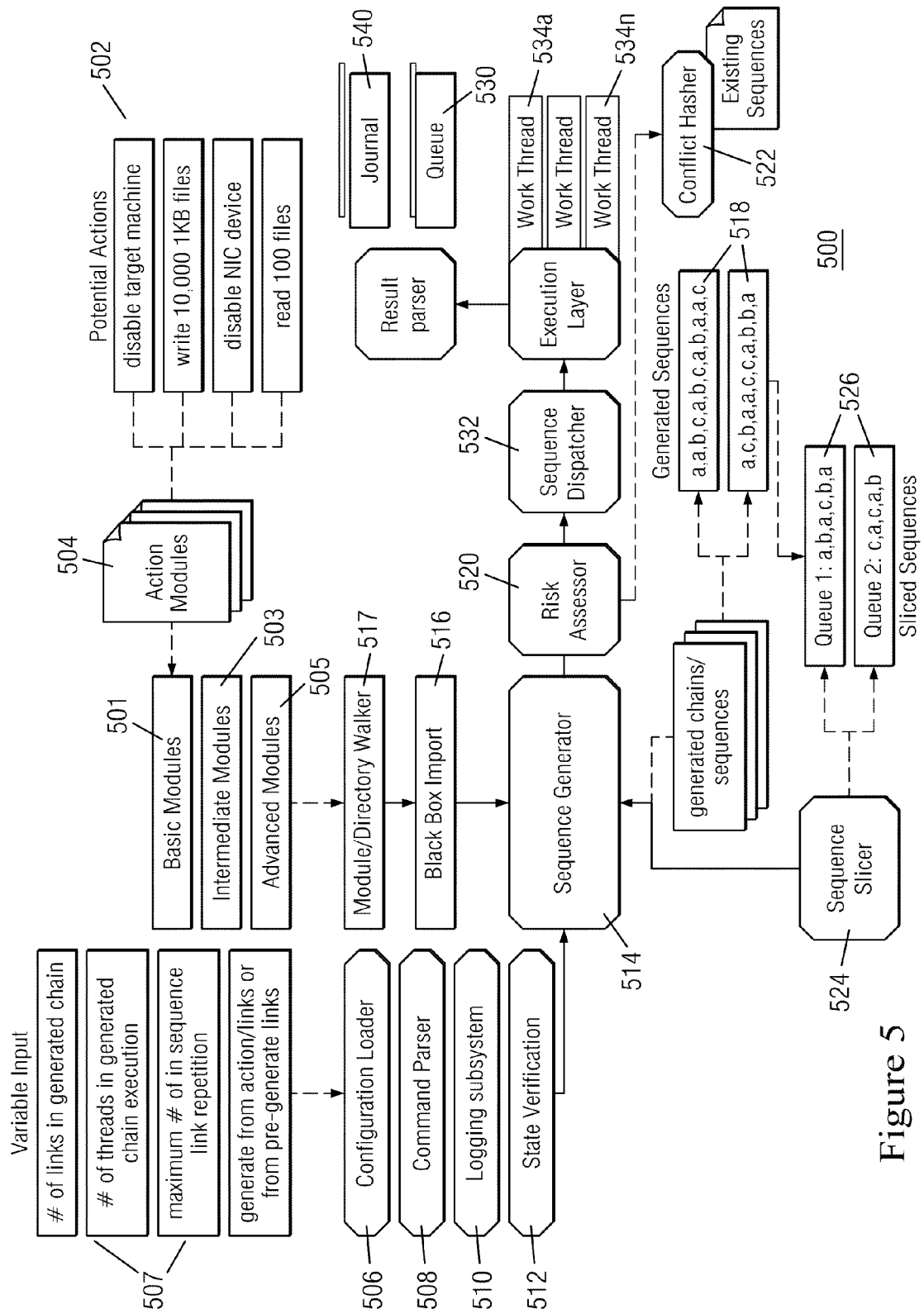
FIG. 5 is a block diagram of an automated test case generation system of the present invention.

FIG. 5 illustrates a representative test system 500 of the present invention. The system comprises a database 502 of potential test actions or links, which actions (as described below) are combinable into one or more action modules 504. Action modules 504 may, in turn, be classified by the nature of the resulting tests, such as "basic" modules 501, intermediate modules 503, and advanced modules 505. Of course, the number of such classifications is configurable. The modules 501, 503 and 505 may be stored in or as a directory. According to the inventive methodology, a test action (a "building block" or "link") is some discrete function, method or class that, typically, cannot be broken down into a smaller component or action. A given test action thus may be considered immutable within the context of the particular system under test. Of course, the definition of a particular test action usually will depend on the nature and type of system under test. In the context of the archive system illustrated in FIGS. 1-3, a particular test action might be: "disable target machine," "write 10,000 1KB files," disable NIC device," "read 100 files," "drop a node," "drop a node's backend Ethernet card," "run a garbage collection," "drop a node, bring the node back up, check node's availability," and so on. As noted above, these are merely representative.

The test system 500 also comprises a set of functions that, in a representative embodiment, are implemented as a set of software classes written in an object-oriented compiled or interpreted programming language, such as Python. The individual classes may be implemented in other languages, such as Java, and particular classes are illustrated and designated for convenience only. Particular classes shown in FIG. 5 may be combined in any convenient manner. A particular test action or link is implemented within an action module 504 (preferably implemented in Python), and, as indicated above, a given module may contain any number (e.g., ones, tens, hundreds, etc.) of discrete actions. The test system preferably is executed on at least one machine having commodity hardware and operating system software (e.g., Linux). The system also includes one or more input and output devices, as well as conventional applications and interfaces.

In operation, a user inputs options 507 to the system using a configuration file and/or a command line interface. These input options are read by a configuration loader 506 or a command parser 508, depending on the nature of the input, and passed to a logging subsystem class 510 and a state verification class 512. Preferably, these options are a set of one or more tunable features, such as a number of execution threads, links, links in the chain, a number of chains, and the like. The options 507 may also include application-specific configuration options depending on the type of system under test. In the example archive system described above, these options may include, for example, a cluster identifier, a domain name of the cluster, the number of nodes in the cluster, a number of tolerable points of failure (TPOF) for the cluster, a size of the files to be written, and the like. As seen in FIG. 5, a sequence generator class 514 receives the input (the set of one or more tunable options) from the state verification class 512 to obtain a list of valid test actions (i.e. the list of Python modules) from the directory. A black box import class 516, with or without support from a module/directory class 517, may be used optionally to import a given library of actions. The sequence generator class 514 parses the list and generates one or more link sequences 518, according to the input constraints. Thus, given a library of actions A, B and C, the sequence generator class might generate sequences: ABC, BCA, CAB, AABC, ABCB, and so on. Generalizing, the sequence generator receives the actions and mixes them to randomly generate permutations, each of which is a sequence or "chain." The sequence generator class 514 passes each generated sequence to a risk assessor class 520. The sequences may be passed one at a time or in batch.

According to a feature of the invention, preferably a tunable risk factor or level is associated with a given link in a generated chain. In an illustrative embodiment, a given link may have one of several values: basic, intermediate or advanced. Taking the example set forth above, a given link (such as link A) may be considered a basic test. Another link (such as link B) may be considered an intermediate test. Yet another link (such as link C) may be considered an advanced test. In the illustrative embodiment, a basic link is seeded with a first (e.g., 10%) value, an intermediate link is seeded with a second (e.g., 50%) value, and an advanced link is seeded with a third (e.g., 90%) value. These values are merely representative, as the number of levels as well as their associated values preferably are tunable. Using these individual link risk factors, the system can generate a risk assessment (e.g., expressed as a percentage value or metric) for the generated chain as a whole, or for some given portion of the chain. An aggregate or composite risk assessment for the chain (or chain portion) preferably is determined (based on a 0-100% scale) by counting the number of occurrences of each link and its associated value. Thus, to give a concrete example (using the representative percentages described above), a chain such as ABCBBACCCAB would have a composite risk factor of 98%, which is calculated as two (2) occurrences of A (at 5% each)+four (4) occurrences of B (at 50% each)+four (4) occurrences of C (at 90% each). The risk assessor class 524 performs this risk assessment function.

Once the risk assessor class 520 verifies the risk level associated with a given sequence, the sequence is passed to a conflict hasher class 522. The conflict hasher class checks the chain database to determine whether the sequence has been previously generated. Preferably, a chain is registered within the database, and each chain has an associated unique identifier (e.g., a serial number) that is preferably derived from the links within the chain. Any convenient hashing algorithm may be used to generate the unique identifier. For example, an MD4, MD5 or SHA-1 hash of the chain itself or the in-memory chain object may be used as the identifier. If the chain has not been seen before, the conflict hasher class 522 registers the chain with the database, using the unique identifier, and then stores the new sequence in the database. The database may have fields to disable or otherwise modify chains. For example, it may be desirable to include override risk/relevance criteria that would control the system, e.g., to run a given chain in a lower priority, to never run a given chain, or the like.

Once the generation and verification of the sequence is complete, optionally the sequence is passed to a sequence slicer class 524, which breaks the sequence up into one or more chunks or portions 526 depending on a number of worker threads desired. The slicer class 524 is not required if a single-threaded execution environment is used, as each link in the sequence (theoretically) will then need to be performed individually and in sequence. A multi-threaded approach is preferred, however, in which case the sequence slicer class 524 breaks the sequences and generates associated work queues 530*a-n* for a set of worker threads. Once the queues are generated, a sequence dispatcher class 532 is called. The dispatcher class 532 instantiates a set of worker threads 534*a-n*, which threads then execute the test sequence. Preferably, the worker threads each maintain a journal 540 of what action was executed at what time (with a value instantiated at runtime to be "0"); upon merger of the thread journals, the system can replay (i.e. re-run) an exact chain in a substantially exact fashion at a subsequent time. The dispatcher class 532 does not have to have any knowledge as to the given library of actions, or how a particular test sequence is generated. As noted above, if any link in the chain fails, preferably the system records the result of the test as a failure. One or more links may need to be executed before other links in the chain, and a particular link may pass given output information to another (e.g., a next) link in the chain. Or, an individual link of the chain may have no functional relationship with any other link.

The system 500 may also include a set of helper classes including, without limitation, the logging subsystem class, the state verification class, and a result parser class 540. These classes provide facilities to the system for information gathering and reporting. Thus, for example, the logging class records the results of each test, the state verification class records the ongoing state or health of the overall system or product under test, and the result parser class determines whether a particular test is successful.

The following provides additional implementation-specific details of a representative embodiment.

As noted above, preferably each test action is a self-contained, discrete Python class/function/method that performs a relatively simple action. Given the archival system example, a "write action" library might comprise a set of basic actions, such as write_files_nfs, write_files_http and write_files_smb. Each action accepts some standard criteria or information; when the action called, the information is passed in, and the action is performed. An example is set forth below:

```
#!/usr/bin/python
def write_http(infodict):
    """"write N files to archive""""
    import commonlib
    cname, fmin, fmax, fcount = commonlib.write_parse(infodict)
    status = ...write...
    retval = commonlib.checkstatus(status)
    return retval
```

This function accepts the incoming dictionary, parses it using a library that it self-imports, and then performs the action. The retval variable is a return message that indicates the "pass/fail" status of the function. The second line of the function is a string that is called by a helper class that documents the results. This facilitates a self-documenting system.

Using the archival system example described above, the following is a representative command line interface (CLI) for designating chain generation options:

Initial interface (CLI)
    Basic CLI should accept:
        Cluster DNS name (-c [name])
        Cluster TPOF (-t [tpof])
        List of cluster nodes. (-n [node,node,node])
        Number of Chains to run (-chains [num])
        Number of Links within chain(s) (-links [num])
        Number of allowable Link repetitions (-reps [num])
        Number of allowable "in sequence" reps to allow (-seq [num])
            Only exposed if -reps is added, defaults to 0
            Example: -reps 2, we do not want to have the same link appear in sequence (ie: AA) but it is valid if it appears in the chain twice (ABA)
        Size of files (range, bytes) to be used by any "write" actions (-fr [min,max])
        Optional, write libraries should have a default.
        Number of files to be used by any "write" actions (-fn [num])
        Optional, write libraries should have a default.
    Example:
        ./links.py -c foo.archivas.com -t 1, -n IP,IP,IP -chains 10 -links 10 -fr 10,1024 -fn 100000

In the above, example, the designated options cause the system to generate and run ten (10) chains ten (10) links deep, with a maximum file range of 1024 bytes, with an initial count of 100,000. Of course, this is merely a representative input data set.

It is desirable to execute a test sequence from start to finish whenever possible. To this end, and before running a given test, the state verification class may be executed to determine whether the cluster is accessible, whether all nodes in the cluster are still available, whether given paths within the archive are reachable, whether there are unusual log entries, or the like. Although this may not prevent further actions from taking place, it ensures that the state of the SUT is known for debugging/investigation purposes.

The test generation system may include other helper classes. As one example, a ratings class may be used to assign a rating to a given chain after that chain is generated and run. The chain ratings may then be used to order test cases, with test sequences that stress the system the most having a highest rating, whereas those that create less stress having lower ratings.

The present invention provides numerous advantages over the prior art. As has been described, the system exploits an automation paradigm by which a library of test actions is processed selectively to create larger test cases or chains. The generated chains may, in turn, be recombined into larger, more complex chains themselves. These chains make up for the deficiencies in the prior art (where there are a given number of static test cases) by automatically generating what are, in effect, "random" test sequences. Thus, where a given set of ten (10) actions might have a set of fifty (50) static test cases associated therewith, the inventive methodology can generate over 3,000,000 combinations of those ten actions, creating a much more robust, useful and extensive test suite. Preferably, the number and type of test sequences are constrained only by a set of user-tunable or system-tunable options. An example of a system-tunable constraint in the context of the archive is a policy that might associate a given "weight" with a given link to facilitate creation of "weighted" random sequences, which allows for tunable amounts of actions constrained by risk assessment or "level" (e.g., "basic," "intermediate" or "advanced") to appear within a chain. The user- or system-tunable constraints may also designate a maximum number of links in a chain, a maximum number of times a given link may occur in a chain, a maximum number of times that a given link may appear next to itself in a given chain, or the like. As noted above, in a preferred embodiment, each link is a standalone or discrete that may pass, or fail. It the link fails, the chain dies.

Preferably, each link has a conduit through which given information may be passed through to a next or other link in the chain. This conduit, for example, is an in-memory data structure, a cached-on-disk data structure, a text file, a socket communication link, or the like. In particular, in one representative embodiment, the conduit is an in-memory data structure passed from the executor to the individual link, and this data structure comprises information about the SUT such as (in the archive cluster application) current file counts, current file locations, number of nodes, and the like. In another embodiment, the conduit is implemented on disk cache as a plaintext or Python-pickled data structure. In either case, preferably the information in the data structure is modifiable and/or expandable by each link, and preferably all links must either accept the in-memory data structure or assume the on-disk location, as the case must be. Preferably, the conduit is maintained by the executor, on the chain's behalf.

A given link in a chain may be either a self-contained entity (e.g., a set of self-contained libraries), or an entity that has associated dependencies. If a particular link has some dependency, preferably that dependency is specified by some criteria, which criteria can then be applied to the link using appropriate system-level or local processing or other resources. If a dependency is needed but is not met, the link is "skipped" or its results ignored. In a preferred embodiment, however, any link dependencies are recognized and verified prior to inclusion of the link in a candidate chain. In this embodiment, a given link has associated therewith given criteria that identify required dependencies. When the system is initialized (e.g., at library import time), the system calls a given dependency verification function within each library to confirm that all identified dependencies are met. In such case, the verification of dependencies must occur before the given link can be used by the sequence generator.

The test generation system of the present invention is also advantageous in that it allows for dynamic test sequence generation as a function of new test actions or new test cases themselves. Indeed, a flexible quality assurance program must take into account regular additions, deletions or modifications of the building blocks and test cases. The inventive system is fluid in the sense that it can at any time generate chains from new actions and tests as needed, easily deprecating irrelevant chains in the process. By registering each chain as it is created, the user or system need not cycle through pre-generated chains before performing a given test suite.

Generalizing, the present invention is a test case generation methodology by which a set of discrete test actions form a set of interchangeable building blocks that are permutated (intelligently random) to generate a set of large-scale tests against which a system under test is then exercised in a re-creatable manner. Each test action is an atomic, preferably immutable step in the overall chain/test case generated.

As a variation, the test generation system may also create the building blocks themselves in an automated manner.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language (e.g., Python) that runs on a standard Intel hardware platform running an operating system such as Linux. Linux, Python and Java are third party trademarks that are the property of their respective owners.

While given components of the system have been described separately, one of ordinary skill will appreciate that some of the functions may be combined or shared in given instructions, program sequences, code portions, and the like.

Having described our invention, what we claim is as follows.

The invention claimed is:

1. A computer-implemented method to generate replayable test cases for a system under test (SUT), comprising:
defining a set of test actions, each of the test actions defining a discrete, atomic operation associated with the system under test;

storing the set of discrete test actions as a set of interchangeable building blocks;

using the set of interchangeable building blocks and at least one input constraint to generate, in an automated manner, a set of test sequences against which the system under test may then be exercised, at least one test sequence of the set of test sequences including a random permutation of the interchangeable building blocks; and breaking at least one test sequence into one or more chunks depending on a number of worker threads that are to be used to exercise the system under test using the test sequence.

2. The computer-implemented method as described in claim 1 further including the steps of:

adding an interchangeable building block, deleting an interchangeable building block, or modifying an interchangeable building block; and generating a new set of test sequences.

3. The computer-implemented method as described in claim 1 wherein the step of using the set of interchangeable building blocks generates a permutation of the interchangeable building blocks.

4. The computer-implemented method as described in claim 1 wherein the input constraint is a number of interchangeable building blocks that may be used to generate a test sequence.

5. The computer-implemented method as described in claim 1 wherein the input constraint is a number of times that a given interchangeable building block may be used in a test sequence.

6. The computer-implemented method as described in claim 1 wherein the input constraint is a number of times that a given interchangeable building block may be used in a given manner within a test sequence.

7. The computer-implemented method as described in claim 1 further including the step of determining whether a given test sequence in the set of test sequences has been generated in a prior test generation sequence.

8. The computer-implemented method as described in claim 1 further including the step of registering a given test sequence in the set of test sequences.

9. The computer-implemented method as described in claim 1 wherein a given interchangeable building block has associated therewith a risk assessment value.

10. The computer-implemented method as described in claim 9 wherein a given test sequence has associated therewith a risk assessment value generated as a function of the risk assessment values of the interchangeable building blocks from which the given test sequence is generated.

11. The computer-implemented method as described in claim 1 wherein a given interchangeable building block has an associated execution dependency.

12. The computer-implemented method as described in claim 11 further including the step of verifying the associated execution dependency before including the given interchangeable building block into the set of interchangeable building blocks.

13. A computer-implemented method to generate replayable test cases for a system under test (SUT), comprising:

collecting a set of interchangeable test actions, each of the test actions defining a discrete, atomic operation associated with the system under test;

collecting a set of test sequences, wherein each of the set of test sequences is generated as a random permutation from the set of interchangeable test actions;

in response to a given input, generating at least one new test sequence;

determining whether the new test sequence already exists in the set of test sequences;

if the new test sequence does not already exist in the set of test sequences, adding the new test sequence to the set of test sequences; and breaking the at least one test sequence into one or more chunks depending on a number of worker threads that are to be used to exercise the system under test using the test sequence.

14. The computer-implemented method as described in claim 13 wherein a given interchangeable test action has associated therewith a risk assessment value.

15. The computer-implemented method as described in claim 14 wherein a given test sequence has associated therewith a risk assessment value generated as a function of the risk assessment values of the interchangeable test actions from which the given test sequence is generated.

16. The computer-implemented method as described in claim 13 wherein the given input is a given constraint.

17. The computer-implemented method as described in claim 16 wherein the given constraint is one of: a number of interchangeable test actions that may be used to generate a test sequence, a number of times that a given interchangeable test action may be used to generate a test sequence, and a number of times that a given interchangeable test action may be used in a given manner within a test sequence.

18. The computer-implemented method as described in claim 13 further including the step of generating a unique identifier for the new test sequence.

19. The computer-implemented method as described in claim 13 wherein a given constraint is associated with the system under test.

* * * * *